June 25, 1957  W. S. TOUCHMAN  2,796,761
ENGINE FUNCTION EFFICIENCY METER
Filed March 5, 1953  4 Sheets-Sheet 2
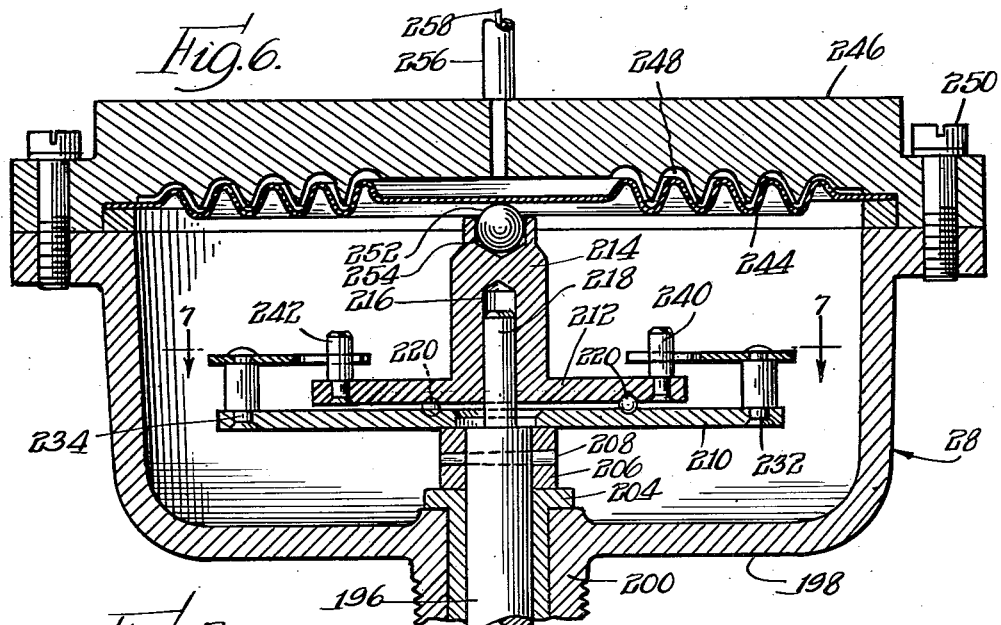
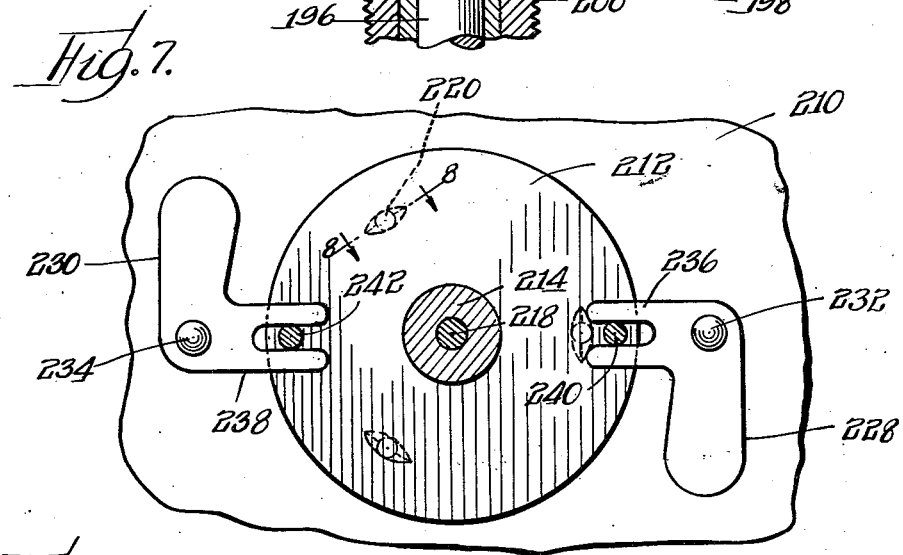
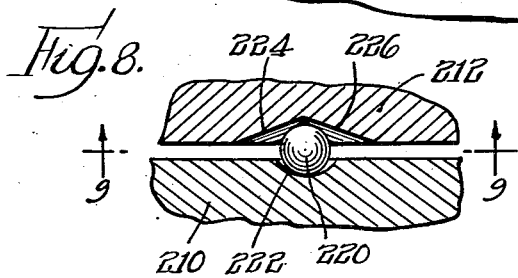
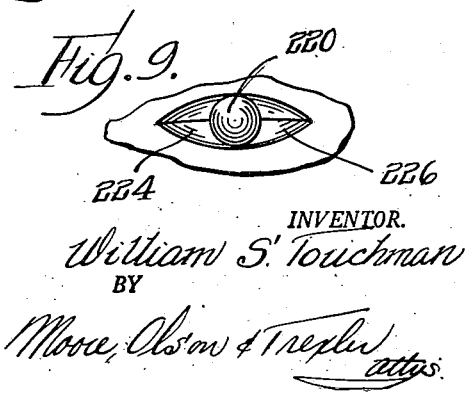
INVENTOR.
William S. Touchman
BY
Moore, Olson & Trexler
attys.

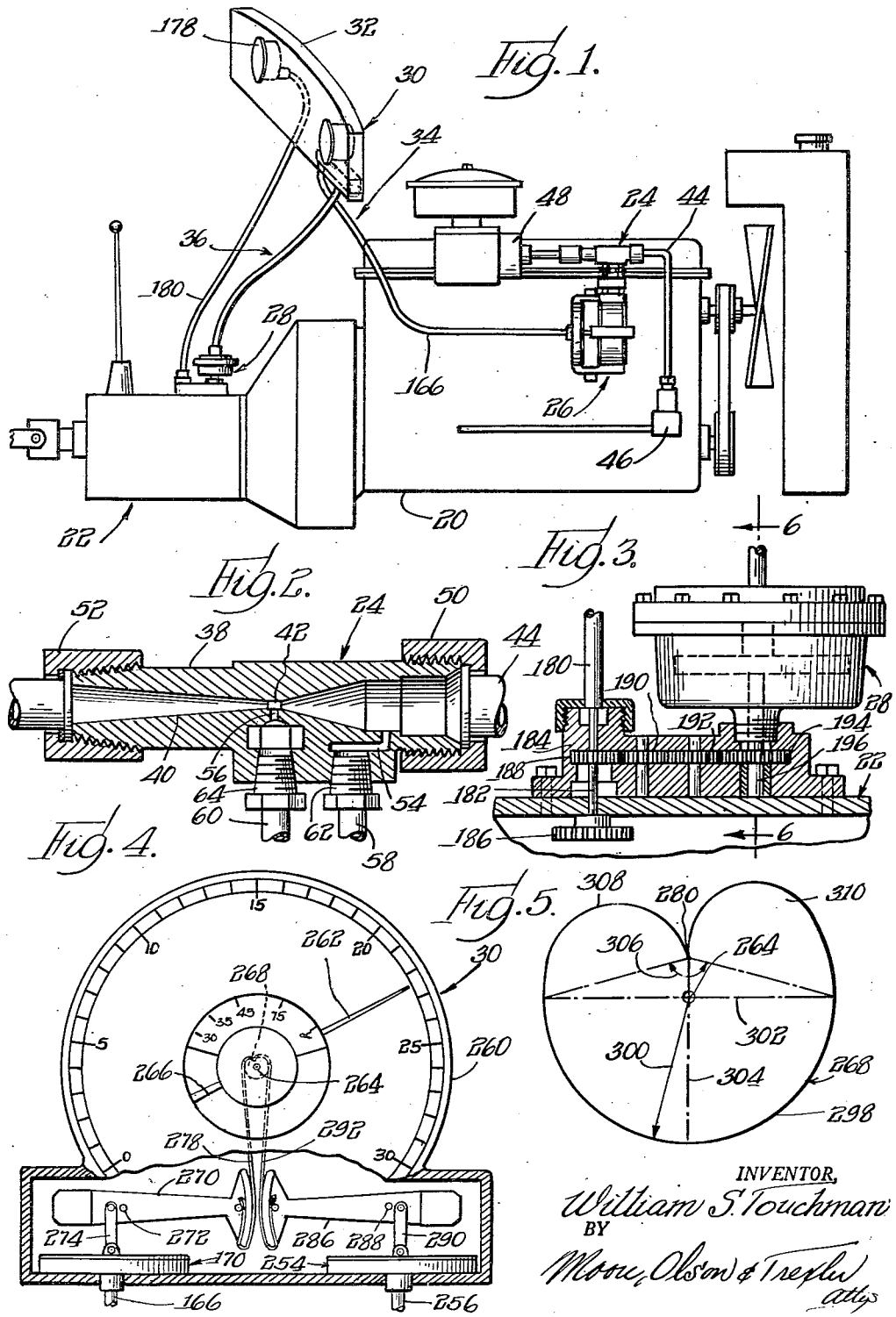

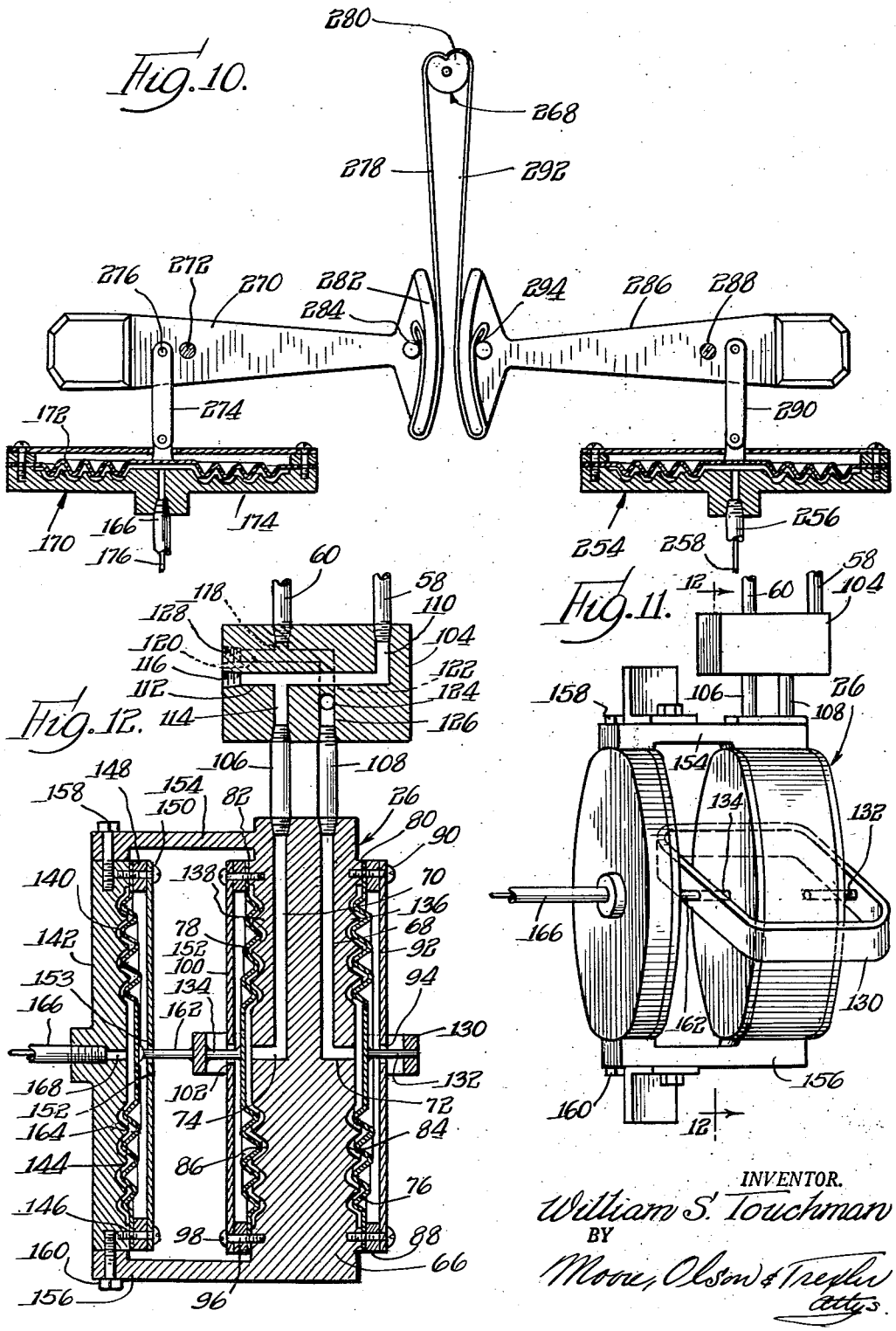

June 25, 1957 W. S. TOUCHMAN 2,796,761
ENGINE FUNCTION EFFICIENCY METER
Filed March 5, 1953 4 Sheets-Sheet 4
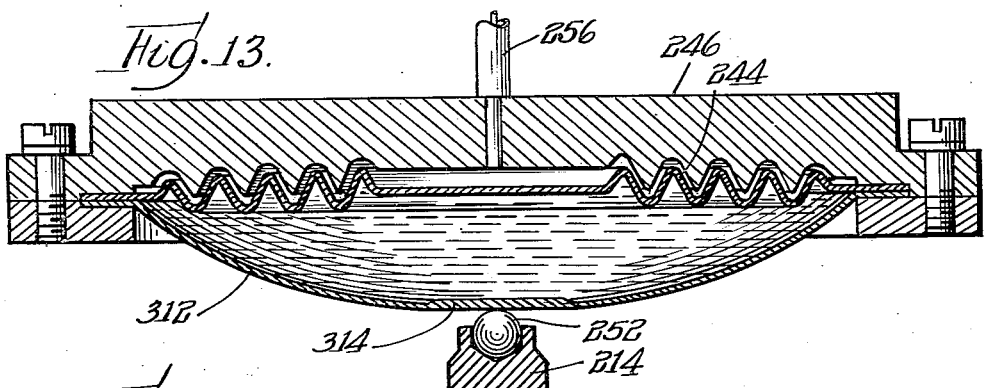
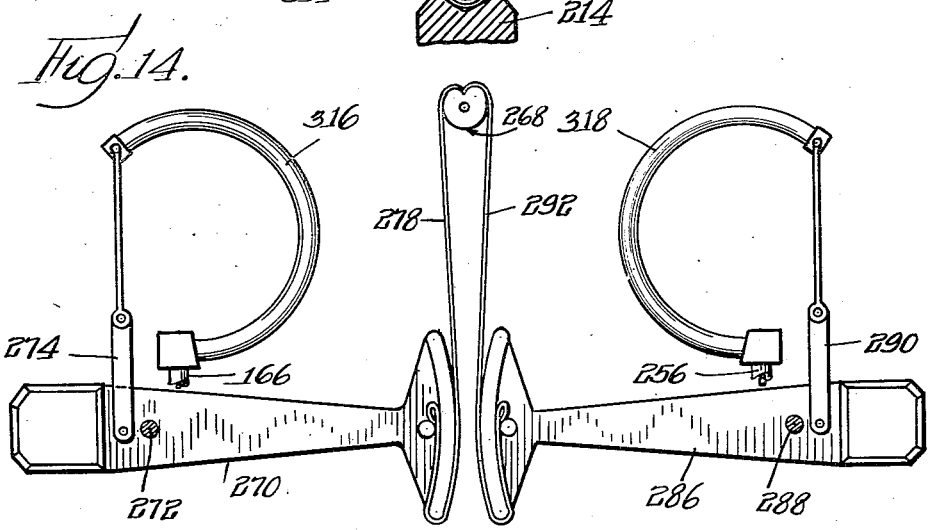
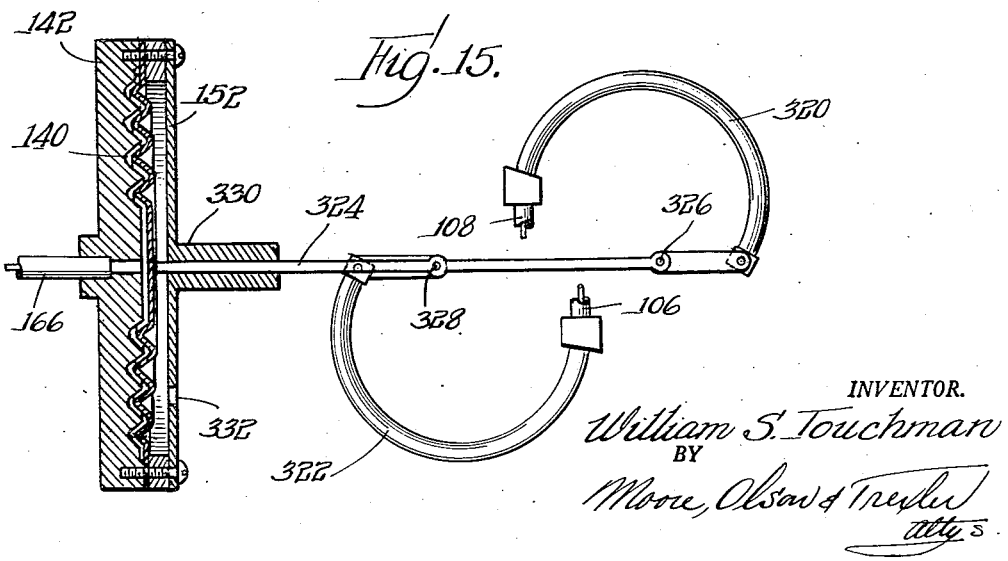
INVENTOR.
William S. Touchman
BY
Moore, Olson & Trexler
attys.

United States Patent Office

2,796,761
Patented June 25, 1957

2,796,761

ENGINE FUNCTION EFFICIENCY METER

William S. Touchman, Yellow Springs, Ohio, assignor to Perc C. Sorenson and Lee Jewell, both of Wauwatosa, Wis.

Application March 5, 1953, Serial No. 340,564

5 Claims. (Cl. 73—114)

The present invention relates to a novel engine function efficiency meter, and more particularly to a novel meter especially adapted for use as a miles per gallon indicator for various self-propelled vehicles, such as automobiles, trucks, airplanes, and boats.

Various devices have been suggested for use as engine efficiency meters or miles per gallon indicators, but these prior art devices have been subject to one or more objections. For example, such prior art devices often give inaccurate performance and are of relatively complex construction, making manufacturing and installation on the vehicle difficult. In some cases, prior art devices have been provided with apparatus for measuring the fuel flow, which apparatus is constructed in manner so that a conduit or tube carries gasoline or other fuel to an indicator unit in the instrument panel, thereby creating a fire hazard within the passenger compartment of the vehicle because of the possibility of fuel leaks.

It is an object of the present invention to overcome the above objections by providing a novel engine efficiency meter or miles per gallon indicator which may be relatively easily manufactured and installed in a vehicle and which gives accurate and easily readable indications of the engine efficiency or the miles per gallon.

Another object of this invention is to provide a meter of the above described type with novel means for creating forces at or adjacent to the engine in response to engine performance and fuel flow, and novel fluid pressure means for transmitting the forces to an indicator mechanism at the instrument panel of the vehicle or to any other desired point.

Yet another object of the present invention is to provide a novel meter of the above described type, wherein the force transferring fluid pressure means is constructed in a manner so as to be substantially unaffected by surrounding atmospheric conditions, thereby to maintain the accuracy of the meter.

Still another object of the present invention is to provide a novel meter of the above described type, wherein the force transferring fluid pressure means does not require any priming either at the initial installation or during subsequent operation.

A more specific object of the present invention is to provide a novel meter of the above described type which includes means for creating a centrifugal force in response to engine performance and novel fluid pressure means responsive to the centrifugal force for actuating a miles per gallon or efficiency indicator mechanism.

Still another specific object of this invention is to provide a meter as described above with novel means for creating a force in response to fuel flow, which means includes a Venturi in a fuel line and a novel pressure mechanism for creating said force in response to pressure differentials at longitudinally spaced portions of the Venturi, and novel fluid pressure means for transmitting said force from the pressure mechanism to a miles per gallon or efficiency indicator at a point spaced substantially from the engine.

Other objects and advantages of the present invention will become apparent from the following description and the accompanying drawings, wherein:

Fig. 1 is a somewhat schematic view, showing the apparatus of this invention installed on a standard motor having a standard transmission;

Fig. 2 is a cross sectional view of a Venturi utilized in the apparatus of this invention;

Fig. 3 is a fragmentary view partially in cross section, showing the device for creating a force in response to the engine performance;

Fig. 4 is a front elevational view partially broken away, showing the miles per gallon indicator unit which is adapted to be mounted on the vehicle instrument panel or at any other desired point;

Fig. 5 is an elevational view, showing the cam used in the miles per gallon indicator unit to combine or balance the forces created in response to engine performance and fuel flow;

Fig. 6 is an enlarged fragmentary cross sectional view taken along line 6—6 in Fig. 3;

Fig. 7 is a fragmentary cross sectional view taken along line 7—7 in Fig. 6;

Fig. 8 is an enlarged fragmentary cross sectional view taken along line 8—8 in Fig. 7;

Fig. 9 is a fragmentary cross sectional view taken along line 9—9 in Fig. 8;

Fig. 10 is an enlarged somewhat schematic front elevational view partially in cross section of the miles per gallon indicator unit shown in Fig. 4;

Fig. 11 is a perspective view, showing the pressure mechanism for creating a force in response to pressure differentials in the Venturi in combination with one end of the pressure means for transferring said force from the pressure mechanism to the miles per gallon indicator unit;

Fig. 12 is a cross sectional view taken along line 12—12 in Fig. 11;

Fig. 13 is a view similar to Fig. 6 and showing a modified form of the apparatus of this invention;

Fig. 14 is a view similar to Fig. 10, but showing a modified form of this invention; and Fig. 15 is a view showing a modified element of this invention which may be substituted for the pressure mechanism shown best in Figs. 11 and 12.

Referring more specifically to the drawings, wherein like parts are designated by the same numerals throughout the various figures, one form of the apparatus of this invention is shown in Fig. 1 as being installed in a standard automobile having an engine 20 and a transmission 22. The engine efficiency meter or miles per gallon indicator includes a Venturi 24, a pressure mechanism 26 for creating a force in response to pressure differentials in the Venturi, a device 28 for creating force in response to engine performance, an indicator unit 30 adapted to be mounted on the instrument panel 32 and fluid pressure means 34 and 36 for transferring the forces from the pressure mechanism 26 and the force creating device 28, respectively, to the indicator unit 30.

Referring particularly to Figs. 1 and 2, it is seen that the Venturi 24 comprises a body member 38 having a bore 40 therethrough of the usual shape to provide a restricted throat 42. The Venturi is preferably installed in the fuel line 44 between the fuel pump 46 and the carburetor 48. The Venturi body member 38 may be connected with the fuel line 44 by any suitable means, such as the threaded nuts 50 and 52. The Venturi body member is provided with a passageway 54 communicating with the enlarged inlet end of the bore 40 and a second passageway 56 communicating with the restricted throat. Fluid conduits or tubes 58 and 60 are connected with the passageways 54 and 56, respectively, by any suitable means, such as the threaded nipples 62 and 64, for conducting fuel, such as gasoline, under different pressures from the spaced areas of the Venturi to the pressure mechanism 26.

Referring particularly to Figs. 11 and 12, it is seen that the pressure mechanism includes a body member 66 having fluid passageways 68 and 70 extending radially therein from one margin of the body member to substantially its center. The passageways 68 and 70 communicate respectively with centrally disposed axially extending passageways 72 and 74, which latter mentioned passageways open at opposite faces of the body member. As shown best in Fig. 12, a flexible diaphragm 76 overlies one face of the body member, and a substantially identical flexible diaphragm 78 overlies the opposite face of the body member. The opposite faces of the body member are provided at their peripheries with axially extending annular flanges 80 and 82, respectively, so that the diaphragms are spaced outwardly from the faces of the body member to provide fluid chambers 84 and 86. A clamping ring 88 overlies the marginal portions of the diaphragm 76 and is held in place by a plurality of screws 90, or any other suitable means. If desired, a cover plate 92 may be provided for protecting the diaphragm 76 from injury. The cover plate is provided with an opening to vent the space between the plate and the diaphragm to the outside atmosphere. This opening may be conveniently formed as at 94. The diaphragm 78 is held in place by a clamping ring 96 and screws 98, which are identical to the above described clamping ring 88 and screws 90. If desired, a cover plate 100 may be provided for protecting the diaphragm 78, and this cover plate should also be vented to the outside atmosphere, as at 102.

The fuel lines 58 and 60 leading from the Venturi enter a manifold block 104, as shown in Fig. 12, through which the fuel is conducted to short conduits 106 and 108, and thence into the body member 66 of the pressure mechanism. It should be noted that the passageways are so formed so that the fuel from the inlet end of the Venturi, which fuel is under the greatest pressure, is directed through the passageways 70 and 74 and into the chamber 86 between the diaphragm 78 and the body member 66, and the fuel from the throat of the Venturi is directed through the passageways 68 and 72 and into the chamber 84 between the diaphragm 76 and the body member 66. To accomplish this, the manifold block 104 is drilled to provide passageways 110, 112, and 114 leading from the conduit 58 to the conduit 106. The open end of the passageway or bore 112 may be closed in a suitable manner, such as a threaded plug 116. The conduit 60 leading from the throat of the Venturi preferably is bent so that it is offset somewhat from the conduit 58 at the manifold block, which block is drilled or otherwise formed to provide bores or passageways 118, 120, 122, 124, and 126 so that the fuel is directed from the conduit 60 to the conduit 108. The open end of the bore 120 is also closed with a threaded plug 128, and it is understood that the open ends of the bores 122 and 124 will be closed with similar plugs, not shown.

From the above described arrangement of the fluid passageways, it will be seen that as fuel flows through the Venturi, the fluid pressures within the chambers 84 and 86 will vary in response to any variations in pressure within the Venturi caused by variations of fuel flow, to flex the diaphragms 76 and 78, respectively. It should be noted that variations in the fluid pressure within the chambers 84 and 86 will cause the diaphragms 76 and 78 to flex in opposite directions. In accordance with one feature of the present invention, these diaphragms 76 and 78 are interconnected with each other so that the fluid pressure or forces tending to flex or actuate the diaphragms in opposite directions are combined into a single force proportional to the pressure differential between the pressures in the chambers 84 and 86. The diaphragms are connected with each other by means of a yoke or ring 130, which surrounds the body member 66, as shown best in Fig. 11. The yoke 130 is connected directly to the diaphragm 76 by means of a pin 132, which has its opposite ends secured as by welding to the yoke and diaphragm. The yoke is similarly connected with the diaphragm 78 by a pin 134. With this structure, it is seen that the fluid pressure within the chamber 86 tends to flex or move the diaphragm 78 toward the left, as viewed in Fig. 11, to move the yoke or ring toward the left and that this movement is resisted by the tendency of the pressure in the chamber 84 to move the diaphragm 76 to the right. Since the pressure differential between the chambers 84 and 86 varies in proportion to the square of the flow of fuel through the Venturi, it is seen that as the fuel flow varies, the yoke or ring will be moved toward the left with a force proportional to the square of the fuel flow.

In order to eliminate substantially the spring effect inherent in flexible diaphragms, the diaphragms 76 are preferably formed from thin sheet metal and are provided with annular corrugations in the well known manner. The sensitivity of the pressure mechanism 26 may be increased by reducing the volume of the chambers 84 and 86, and in the preferred embodiment, this is accomplished by providing the opposite faces of the body member 66 with annular ribs 136 and 138, which project into the corrugations of the diaphragms 76 and 78, respectively.

A feature of this invention resides in the provision of the novel fluid pressure means 34 for transmitting the force tending to move the yoke or ring 130 to the indicator mechanism 30. Referring to Figs. 11 and 12, this pressure means includes a flexible diaphragm 140 and a plate 142 which are axially spaced to provide a fluid chamber 144. The plate member 142 may be provided with an annular flange 146 to space the diaphragm from the face of the plate, and the diaphragm 140 may be conveniently secured to the plate by means of a securing ring 148 and a plurality of screws 150. If desired, a cover plate 152, which is vented, as at 153, may be provided for protecting the diaphragm. The diaphragm 140 and plate 142 assembly may be conveniently mounted to the body member 66 of the pressure mechanism by means of arms 154 and 156 and screws 158 and 160. The arms may be formed integrally with the body member 66, as shown, or may be formed separate from the body member if desired.

The diaphragm 140 is connected directly to the yoke or ring 130 by means of a pin 162 so that the diaphragm 140 is flexed with a force equal to the force moving the yoke or ring. Thus, as the fuel flow through the Venturi increases, the diaphragm 140 is moved toward the left, as viewed in Fig. 12, to decrease the volume of the chamber 144 to increase the fluid pressure within said chamber. In order to increase the sensitivity and accuracy of the fluid pressure means, the diaphragm 140 is preferably formed of thin sheet metal with annular corrugations, and the face of the plate member is provided with a plurality of annular ribs 164 which extend between the annular corrugations to reduce the volume of the chamber 144.

In order to convey the change of pressure within the chamber 144 caused by the movement of the diaphragm 140 to the indicator mechanism 30, a relatively long tube 166 is provided and communicates at one end with the chamber 144, as at 168. The opposite end of the tube 166 is connected with a pressure responsive diaphragm assembly 170 similar to the diaphragm 140 and plate 142 assembly, a shown in Fig. 10. The assembly 170 includes a flexible diaphragm 172, which is substantially identical to the diaphragm 140, and a plate or body member 174, which is identical to the body member 142. It is, thus, seen that as the diaphragm 140 is moved to the left under the pressure of the yoke or ring 130, the fluid pressure within the chamber 144 is increased and this fluid pressure is transmitted through the tube 166 to the assembly 170 to cause the diaphragm 172 to move or flex upwardly. In the preferred form of this invention, the fluid within the chamber 144, the tube 166, and the assembly 170 is air or any other suitable gas. By utilizing a gas instead of a liquid, it is generally unnecessary to provide means for compensating for the weight of the fluid within the tube in order to obtain accurate performance of the meter. In order to obtain accurate performance, it is desirable that the bore of the tube 166 be kept small and also that the volume of the chamber 144 and the chamber within the assembly 170 be kept small. It has been found that when the bore of the tube 166 is too small, the bore may become pinched during assembly of the meter due to bending of the tube. In order to overcome this difficulty, while at the same time providing a tube having an internal cross sectional area sufficiently small to provide the desired accuracy, a wire 176 is inserted within the tube throughout the entire length thereof. It has been found that a tube having a bore with a diameter of 0.030 inch and a wire having a diameter of 0.02 inch will give satisfactory results. However, it is to be understood that these dimensions are given only by way of example, and other tube and wire sizes may be used if desired.

The device 28 for creating a force in response to engine performance is shown best in Figs. 3 and 6. This device is preferably mounted on the transmission 22 and may be combined with the drive for a standard speedometer. As shown in Figs. 1 and 3, a speedometer 178 is driven by the usual flexible drive shaft 180, which drive shaft is connected in the usual manner to a shaft 182 mounted in a housing 184 and carrying a gear 186. The gear 186 is driven by the transmission in the usual manner. The shaft 182 carries a gear 188 for driving the device 28 through idler gears 190 and 192 and gear 194 fixed to a shaft 196 journaled in the housing 184.

Referring to Fig. 6, it is seen that the device 28 includes a housing 198 having a threaded nipple 200 adapted to be threaded into a complementary socket of the housing block 184. The shaft 196 extends upwardly from the housing 184 and into the housing 198 through a bushing 204. A rotor mechanism is mounted on the shaft 196 for creating a force in response to engine performance, which force may then be transferred to the indicator mechanism 30 in the manner described hereinbelow. This rotor mechanism includes a sleeve 206 surrounding the shaft 196 and fixed thereto by a pin 208, or any other suitable means. A substantially flat rotor plate 210 rests on top of the sleeve 208 and is fixed thereto in any suitable manner, such as by welding. A second rotor plate 212 overlies the plate 210 and is provided with an axially extending member 214 having a central bore 216 adapted to receive a reduced diameter upper end portion 218 of the shaft 196. The plate 212 is supported on the plate 210 by means of a plurality of steel balls 220. In the preferred embodiment illustrated, three of these balls 220 have been provided in order to maintain the plate 212 parallel with the plate 210. Referring particularly to Figs. 6 and 8, it is seen that each of the balls 220 is disposed in a seat 222 in the lower plate 210, so that the balls are maintained in positions spaced evenly about the plate. As shown best in Figs. 8 and 9, the upper plate 212 is provided with a recess for receiving each of the balls 220, each of which recesses includes inclined cam surfaces 224 and 226.

A pair of flyweights 228 and 230 are mounted on the rotor plate 210 by means of vertically upstanding pins 232 and 234, respectively. Each of the flyweights is spaced above the rotor plate 210 and above the rotor plate 212 by means of a sleeve surrounding its respective pivot pin, as shown in Fig. 6. As shown best in Fig. 7, each of the flyweights is in the form of a bell crank having a weighted outer end and an inner arm, as at 236 and 238, respectively. Each of the inner arms of the flyweights is slotted for the purpose of slidably receiving a pin fixed to the rotor plate 212. As shown in Figs. 6 and 7, a pin 240 is fixed on the plate 212 and extends into the slotted flyweight arm 236, and a similar pin 242 is mounted on the plate 212 in position to extend into the slot of the flyweight arm 238. The pins 240 and 242 may be secured to the plate 212 in any suitable manner, and in the embodiment shown, each of the pins is provided with a reduced diameter end portion disposed within an aperture in the plate 212 with the free end of the reduced diameter portion upset to hold the pin in place.

From the above description, it will be seen that upon rotation of the rotor mechanism, the outer weighted ends of the flyweights will be thrown outwardly by centrifugal force, thus causing the flyweights to rotate about their respective pivot pins. This rotation or pivotal movement of the flyweights causes the plate 212 to be rotated relative to the rotor plate 210 by means of the slotted arms of the flyweights and the pins 240 and 242 secured to the plate 212. Upon this relative rotation between the plates 210 and 212, the inclined cam surface 226 of each of the recesses in the plate 212 receiving each of the balls 220 rides up on the ball, thus causing axial movement of the rotor plate 212 away from the plate 210. Whether the inclined cam surfaces 224 or 226 will ride up on the balls will depend, of course, upon the particular construction of the flyweight. In any event, the rotor plate 212 will be moved away from the plate 210 with a force proportional to the square of the speed of rotation of the rotor mechanism, which speed is controlled by the engine performance.

In order to transfer the above mentioned axially directed force provided by the axial movement of the plate 212 to the indicator unit 30, a fluid pressure responsive device 36 is provided, which device is composed of elements similar to the above described elements of the pressure responsive device 34. Thus, a flexible diaphragm 244 is mounted in combination with a body member 246 to provide therebetween a fluid chamber 248, which fluid chamber corresponds to the above described fluid chamber 244 between the above described flexible diaphragm 140 and body member 142. In the preferred embodiment, the diaphragm 244 and body member 246 assembly is mounted on the housing 198 by means of a plurality of screws 250 or any other suitable securing means. It should be noted that the rotor mechanism and the diaphragm 244 are constructed and arranged so that when the diaphragm is in a substantially unflexed condition and before the rotor plate 212 has moved away from the plate 210, the upstanding portion 214 of the rotor mechanism or some means thereon contacts the diaphragm. In the preferred embodiment, as shown in Fig. 6, the upstanding portion 214 of the rotor mechanism does not actually contact the diaphragm, but instead a bearing ball 252 rotatably mounted in a seat 255 in the end of the member 214 is provided for obtaining substantially friction-less contact between the rotor mechanism and the diaphragm. It should be noted that the parts are arranged so that the ball 252 contacts substantially the center of the diaphragm so that sliding friction between the ball and the diaphragm is reduced to a minimum.

The pressure responsive device 36 includes a diaphragm assembly 254 at the indicating unit 30 which is substantially identical to the previously described assembly 170 and, therefore, need not be described in detail. A fluid conduit or capillary tube 256, which is identical to the above described tube 166 connects the assembly 254 with the chamber 248 between the diaphragm 244 and the body member 246. Preferably, a wire 258 is disposed within the tube 256 for the same purpose as the wire 176 is disposed within the tube 166.

The indicating mechanism 30, which is shown best in Figs. 4 and 10, includes a casing 260 of any desired construction, which is adapted to be mounted in an instrument panel or in any desired location. The casing is provided with a dial face which is calibrated to give readings of miles per gallon from zero to thirty on the large scale about the periphery of the dial and from thirty to infinity on the small scale adjacent the midportion of the dial, as shown in Fig. 4. An indicating pointer 262 is provided for cooperating with the large scale to give the miles per gallon reading. This pointer is fixed on a pin 264 rotatably mounted within the casing by any suitable means, not shown. A second and shorter indicating pointer 266 is provided for cooperating with the smaller scale on the dial face to give miles per gallon readings from thirty to infinity. This shorter pointer 266 may conveniently be formed integral with the pointer 262.

In order to combine or balance the forces which are created in response to fuel flow and engine performance by the mechanisms described above in a manner to rotate the pointers to give the proper miles per gallon reading, a cam 268 is fixed on the shaft or pin 264 and is adapted to receive said forces by means of the apparatus described fully hereinbelow.

In order to apply the force created in response to the fuel flow to the cam 268, the lever mechanism shown in Figs. 4 and 10 is provided. This mechanism includes a lever arm 270 which is pivotally mounted within the casing 260 by a pin, as at 272. This lever is connected with the diaphragm 172 of the assembly 170 by a link 274. It should be noted that the link is pivotally connected to the lever at 276 so that upon upward movement of the link caused by upward movement of the diaphragm 172, the inner or righthand end of the lever, as viewed in Figs. 4 and 10, will be moved downwardly away from the cam. A suitable flexible tape or wire 278 is connected between the lever 270 and the cam for transmitting the force from the lever to the cam. As shown best in Fig. 10, the tape 278 is anchored to the cam at 280 by any suitable means, and the opposite end of the tape passes over a curved head 282 of the lever and is secured at 284.

The force created in response to engine performance is transmitted from the diaphragm assembly 254 to the cam by a linkage mechanism which is substantially identical to the linkage mechanism described in the preceding paragraph. Thus, a lever 286 is pivotally mounted, as at 288, and is connected with the diaphragm of the assembly 254 by a link 290. A flexible tape or wire 292 is anchored to the cam, as at 280, and to the lever 286 at 294.

To provide proper operation of the pointers in the particular embodiment shown, the cam 268 is shaped as best shown in Fig. 5, wherein the cam is disposed in its Fig. 4 position with the pointer 262 indicating a reading of 22.5 miles per gallon. The cam has a circular portion 298 defined by a radius 300 below the horizontal center line 302. The anchorage point 280 is disposed on the vertical center line 304 a distance above the center of the pivot pin 264 so that the angle 306 subtended by the horizontal center line is approximately 145°. Lobe portions 308 and 310 between the horizontal center line and the anchorage point are shaped to conform to the scale grades so as to provide effective force or torque arms inversely proportional to the applied forces for the scale indication at each cam position, as will be understood.

In operation of the structure, the forces created as described above in proportion to the square of the fuel flow and the square of the engine performance or speed are transmitted from the force creating devices 26 and 28, respectively, to the cam 280 by means of the pressure transmission devices 34 and 36, and the linkage mechanism and tapes, to the indicator device 30. The forces exerted in opposite directions on the force balancing cam by the tapes or wires 278 and 292 effect movements of the pointers 262 and 266 to provide a continuous instantaneous reading of the miles per gallon performance of the engine—determined by comparison of the instantaneous fuel flow rate with the engine performance or speed.

In Fig. 13, there is shown a slightly modified form of the present invention which it may sometimes be desirable to substitute for the structure shown in Fig. 6. With the structure shown in Fig. 6, it has been found that after continuous application of forces to the diaphragm 244 by the ball 252, the diaphragm may be deformed slightly because of the concentration of the forces at a single point. In order to overcome this difficulty, the apparatus shown in Fig. 13 is substituted. As indicated by like numerals, the device shown in Fig. 13 includes a body member and corrugated thin metal diaphragm identical to the body member and diaphragm of the device shown in Fig. 6. In addition, a second relatively heavy diaphragm 312 is provided between the ball 254 and the metal diaphragm 244. The space between the diaphragms 244 and 312 is filled with a liquid so that forces applied to the diaphragm 312 by the ball 254 are transmitted uniformly to the entire surface of the diaphragm 244. The diaphragm 312 is preferably constructed of rubber or a plastic material having a low spring rate so that a sufficient thickness of the material may be used to withstand the concentrated pressure applied by the ball 254 without injury. In addition, the diaphragm 312 may be thickened or reinforced, as at 314. By this structure, it is seen that the advantages of using a thin metal diaphragm 244 for providing accurate response and the advantages of using a tough flexible rubber or plastic diaphragm to avoid injury are combined to provide a unit capable of long life and accurate and sensitive response to the applied forces.

Fig. 14 illustrates a modified form of the present invention which may be substituted for the apparatus shown in Fig. 10. From the like numerals applied to the same parts, it is seen that the only change in the modification shown in Fig. 14 is that Bourdon tubes 316 and 318 have been substituted for the diaphragm assemblies 170 and 254, respectively. The modified structure shown in Fig. 14 has the advantage that the Bourdon tubes provide a slightly greater lineal movement in response to pressure variations than do the diaphragms of the assemblies 170 and 254. Thus, the Bourdon tubes will reduce small fluctuations of the pointer in response to small variations of fluid pressure within the pressure responsive devices 34 and 36 due to vibrations, road shocks, or other causes.

In Fig. 15, there is illustrated a modified form of the present invention which may be substituted for the pressure responsive mechanism 26 shown in Figs. 11 and 12. In this modification, the parts remain substantially the same, as indicated by like numerals, except that Bourdon tubes 320 and 322 have been substituted for the diaphragms 76 and 78. The Bourdon tubes 320 and 322 are pivotally connected with a push rod 324, as at 326 and 328, respectively. It should be noted that the Bourdon tubes are connected with the push rod 324 in a manner so that they oppose each other in order that the rod 324 moves in response to the pressure differential between the fuel pressures within the two Bourdon tubes. In this embodiment, the cover 152 protecting the diaphragm 140 is preferably provided with a bearing sleeve 330 for guiding and supporting the rod 324. The cover plate 152 is provided with one or more apertures 332 to provide a vent to the outside atmosphere.

From the above description, it is seen that the present invention provides a novel apparatus fully capable of carrying out the objects heretofore set forth. More specifically, it is seen that the present invention provides a novel apparatus whereby forces in response to fuel flow and engine performance are created at or adjacent the engine and engine transmission and are thence transmitted to an indicating mechanism by novel fluid response devices. In addition, it is seen that the novel fluid responsive devices are of simple structure and may be easily installed in an automobile or any other vehicle. Furthermore, the fluid responsive devices provide an accurate and sensitive response to the forces applied thereto and are of such structure as to eliminate any possible fire hazard in the passenger compartment of the vehicle and to eliminate any necessity for providing means for calibrating the indicator mechanism in accordance with the weight of fluid within the devices. The small air tubes 166 and 256 are of low cost, and readily installed. Priming devices are eliminated. Diaphragm arrangements are provided having a very low or substantially negligible spring rate; and in this connection in instances wherein thin metal diaphragms have been described, plastic or impregnated fabric diaphragms may be used if a further reduction in spring rate is desired.

While the preferred embodiments of the present invention have been shown and described herein, it is obvious that many changes may be made in the structural details of the illustrated apparatus without departing from the spirit and scope of the appended claims.

I claim:

1. An engine function efficiency meter, comprising means for creating a force in response to engine speed, said means including rotor means driven in response to engine speed, actuating means movable in response to centrifugal force created by the rotation of said rotor means and said rotor means including means for rotating said actuating means relative to the rotor means in response to the centrifugal force, and inclined cam means between said rotor means and said actuating means movable in response to centrifugal force for axially shifting said actuating means upon rotation thereof relative to said rotor means; fluid pressure force transmitting means including flexible diaphragm means engageable with and shiftable in accordance with any movement of said actuating means for varying fluid pressure within said transmitting means and thereby varying a force provided by said transmitting means, means for creating a force in response to fuel flow to the engine, and means actuated in one direction by the force of said fuel flow responsive means and also actuatable in an opposite direction by said fluid pressure force transmitting means to provide a determination of engine function efficiency.

2. An engine function efficiency meter, comprising means for creating a force in response to engine speed, sealed pressure means filled with gas responsive to said force, means for creating a second force in response to fuel flow to the engine and including a Venturi member disposed in an engine fuel line and a pressure mechanism disposed adjacent said Venturi member and responsive to the pressure differential between longitudinally spaced portions of the Venturi member; said pressure mechanism including a pair of conduit means communicating with the longitudinally spaced portions of the Venturi member, a pair of fluid pressure chamber means respectively connected with said conduit means, a pair of oppositely actuating flexible diaphragms respectively partially defining said chamber means, and reciprocable means connected with said diaphragms; a second sealed pressure means filled with gas responsive to said second force and connected with and actuated by said reciprocable means, rotatable cam means for combining the responses of both of said pressure means to provide a determination of engine function efficiency, and a pair of means including elongated flexible elements respectively connected to said cam means in opposition to each other to operatively interconnect with said first and second pressure means for actuating said cam means.

3. An engine function efficiency meter, as defined in claim 2, wherein each of said diaphragms include annular corrugations, and wherein each of said chamber means includes means extending between said corrugations and reducing the volume of the chamber means.

4. An engine function efficiency meter comprising means connectable in an engine fuel line for establishing different fluid pressures at longitudinally spaced areas of said means in accordance with the rate of fuel flow to the engine, a pair of oppositely acting pressure responsive elements respectively connected with said spaced areas, and connected with a shiftable member for actuating said shiftable member in accordance with the differential between the fluid pressures at said spaced areas, a fluid pressure chamber partially defined by a flexible diaphragm disposed adjacent said pressure responsive elements, said shiftable member being connected with said diaphragm, a fluid pressure line connected with said chamber, a second fluid pressure chamber connected with said pressure line and partially defined by a second flexible diaphragm which is actuated in accordance with the rate of fuel flow to the engine, rotor means to be driven in accordance with the engine speed for creating a centrifugal force, a third fluid pressure chamber partially defined by a third diaphragm adjacent said rotor means, a shiftable member associated with said rotor means and movable in accordance with said centrifugal force for actuating said third diaphragm, a fourth fluid pressure chamber adjacent said second fluid pressure chamber and partially defined by a fourth flexible diaphragm, a second fluid pressure line connected with said third and fourth chambers so that said fourth diaphragm is actuated by a force in accordance with the engine speed, and means operatively connected with said second and fourth diaphragms for combining forces provided thereby and determining the engine efficiency.

5. An engine function efficiency meter, as defined in claim 4, wherein said first and second mentioned shiftable members are respectively disposed for substantially straight line reciprocable movement and are substantially axially aligned with their respective associated diaphragms.

References Cited in the file of this patent

UNITED STATES PATENTS

| | | |
|---|---|---|
| 1,181,566 | Bowden | May 2, 1916 |
| 1,225,527 | Thompson | May 8, 1917 |
| 1,519,269 | Schroeder | Dec. 16, 1924 |
| 1,783,251 | Marr et al. | Dec. 2, 1930 |
| 1,847,086 | Gargon | Mar. 1, 1932 |
| 2,031,192 | Sutherland et al. | Feb. 18, 1936 |
| 2,268,549 | Kennedy | Jan. 6, 1942 |
| 2,507,442 | Holley et al. | May 9, 1950 |
| 2,522,299 | Redue | Sept. 12, 1950 |
| 2,587,701 | Davis | Mar. 4, 1952 |